(No Model.)

W. H. TURNER.
FISH INCLOSURE.

No. 313,458. Patented Mar. 3, 1885.

Witnesses:
J. C. Brecht
Frank D. Ellsworth

Inventor.
William H. Turner,
By R. K. Evans,
Attorney.

UNITED STATES PATENT OFFICE.

WILLIAM H. TURNER, OF MARTINSVILLE, OHIO.

FISH-INCLOSURE.

SPECIFICATION forming part of Letters Patent No. 313,458, dated March 3, 1885.

Application filed April 15, 1884. (No model.)

*To all whom it may concern:*

Be it known that I, W. H. TURNER, of Martinsville, in the county of Clinton and State of Ohio, have invented certain Improvements in Ponds for the Propagation and Keeping of Fish; and I hereby declare the following to be a full, clear, and exact description of the same, reference being had to the accompanying drawings, in which—

Figure 1:
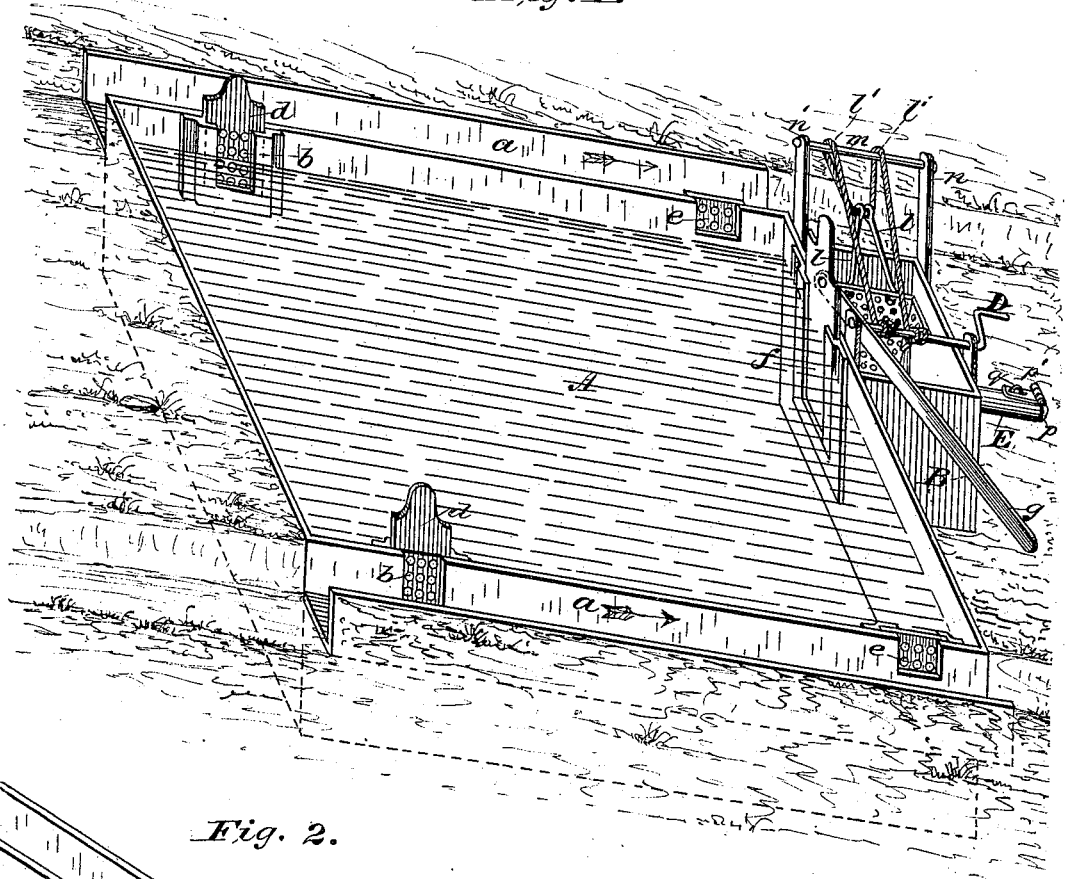
Figure 2:
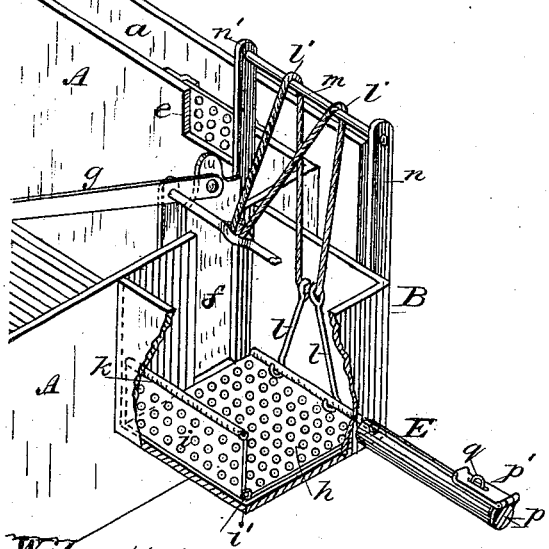
Figure 3:
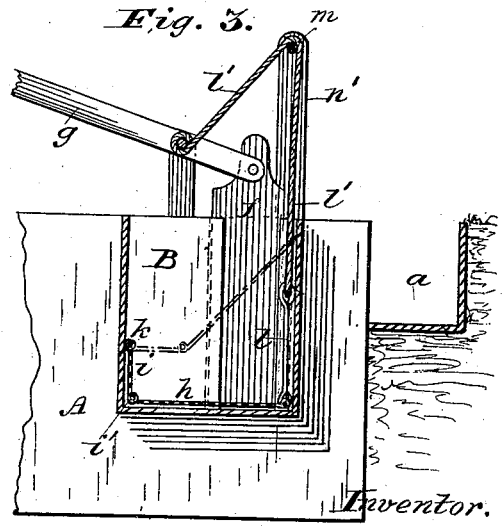

Figure 1 is a perspective view generally illustrating my improvements. Fig. 2 is an enlarged view of a supplemental inclosure wherein to feed the fish and to catch them, the sides being cut away to show the interior construction. Fig. 3 is a vertical sectional view of the supplemental inclosure, showing the screen which secures the fish in solid lines against the bottom and side and in dotted lines raised to catch the fish.

My invention relates to artificial ponds for use in propagating and keeping fish in a manner whereby they can be fed and caught with facility and the pond be protected from undesirable inflowing water.

My invention consists of sundry details of construction, all of which will be fully hereinafter described, and specifically pointed out in the claims.

In order that those skilled in the art may make and use my invention, I proceed to describe the manner in which I have carried it out.

In the said drawings, A is the pond proper, so constructed that its upper edge is above the surface of the water, and *a a* are gutters or grooves extending in the line of the flow of the water, as indicated by the arrows, alongside the upper edges of the pond. The gutters or grooves *a a* act as drains to carry off the surface-water not needed to fill the pond, and through which the washings and débris from the sides or above the pond may be carried by and below the pond instead of passing into and filling it up. On each side, near the head of the pond, are openings through the wall or sides of the pond from gutters *a a*, as seen at *b b*, the said openings being covered by netting, and each furnished with a water-gate, *d d*. By opening the water-gates *d d* water will, when desired and in proper condition, flow through openings *b b* into the pond. In times of freshets and at other times when the water is not needed in the pond the water-gates are kept closed. The openings *e e*, covered with net-work at the lower end of the pond, will allow all surplus water to flow out of the pond, and yet not run indiscriminately over its edges and wash the sides or banks of the pond. At the lower end of the pond, and connected therewith by a netless opening, controlled by a sliding gate, *f*, operated by lever *g*, I construct a supplemental inclosure or small pond, B, wherein the fish may be habitually fed, in order to accustom them to passing through the opening beneath gate *f*. The bottom of the supplemental inclosure B is provided with a false movable bottom of wire-netting, *h*, one edge of which is hinged to a section of wire-netting, *i*, as seen at *i'*. The section *i* in the direction of the pintle of the hinge has the same dimension as the section of netting *h*, but in the opposite direction has less dimension. The edge of netting-section *i* opposite to the hinge *i'* is hinged to the vertical wall of supplemental inclosure B at *k*, thus forming a sort of hinged netted false bottom, one end of which is hinged to the wall at *k*, as aforesaid, and the opposite end free and engaging with two loops, *l l*, which in turn are secured to cords *l'*, passing up over a cross-bar, *m*, supported in line with the wall by means of two posts, *n n'*, and thence to a winch or windlass, D, located at any convenient point. By turning the windlass D the cords are pulled and the hinged netting bottom is drawn upward to the position shown in dotted lines in Fig. 3, whereupon the fish that may have been raised by the netting can with ease be caught or examined, the door *f* having been closed prior to the raising of the false bottom. By using the posts *n n'* and the cross-bar *m* the false bottom is made to move with its free end hugging close to the wall as it moves, so no fish can pass downward over the edge. At the bottom of the receptacle B or inclosure for catching and examining the fish is a spout, E, in the end of which is screwed a plug, *p*, provided with a hasp, *p'*, adapted to engage over a staple, *q*, on the spout E, so that any amount of water can be retained in B, and the plug can be secure against accidental or malicious draining of the pond. The false netting bottom should normally remain on the bottom of the supplemental inclosure and gate *f* remain open, so the fish may always be fed inside of B, and at no other place. When it is desired to catch or examine any of the fish, a little food is thrown into the inclosure B, which will bring in the fish. Gate $f$ is then closed and the false bottom lifted, and the fish treated as desired.

Having thus described my invention, what I claim as new, and desire to secure by Letters Patent, is—

1. The pond A, provided with an inclosing-wall and adjacent gutters $a\ a$, in combination with connecting-openings and controlling-gates, for the purpose described.

2. The pond A, in combination with a supplemental inclosure, B, provided with a cut-off gate, $f$, pivoted lever $g$, and spout E, all constructed and arranged to operate as set forth.

3. The inclosure A and supplemental inclosure B, in combination with a hinged foraminous bottom, $h\ i$, and hoisting devices, for the purpose specified.

4. The false bottom, jointed at $i'$ and hinged at $k$, having one free end, and the hoisting devices, in combination with posts $n\ n'$ and cross-bar $m$, to force the edge of the false bottom to hug the wall, as set forth.

WILLIAM H. TURNER.

Witnesses:
J. E. BETTS,
C. C. MORE.